Dec. 13, 1966  H. J. SHAY  3,291,513
DOOR LATCH FOR AUTOMOTIVE VEHICLE
Filed March 23, 1964  5 Sheets-Sheet 1
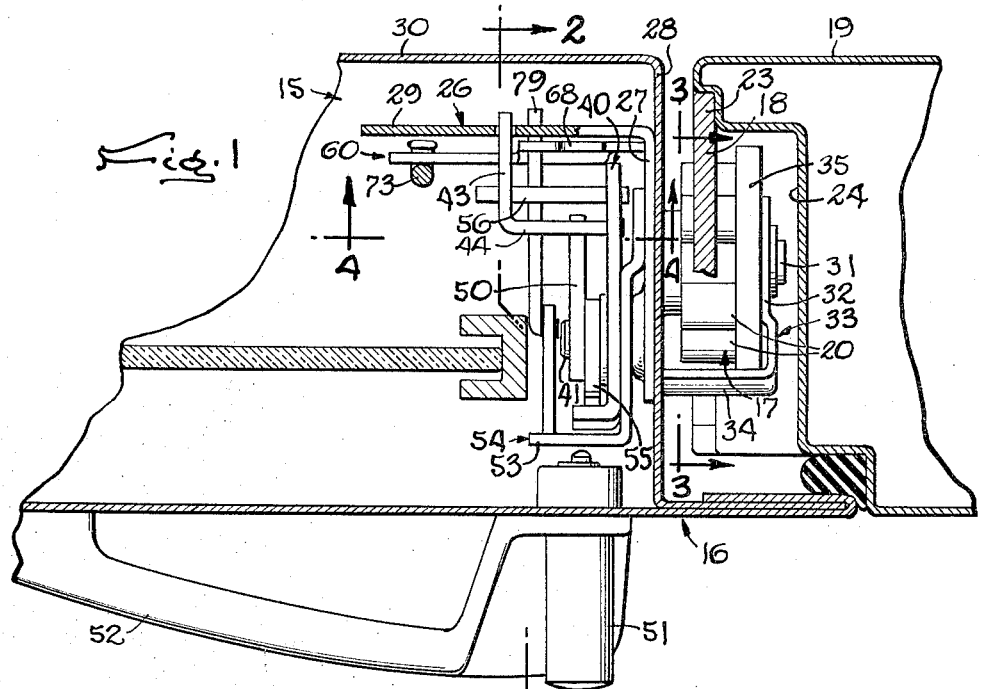
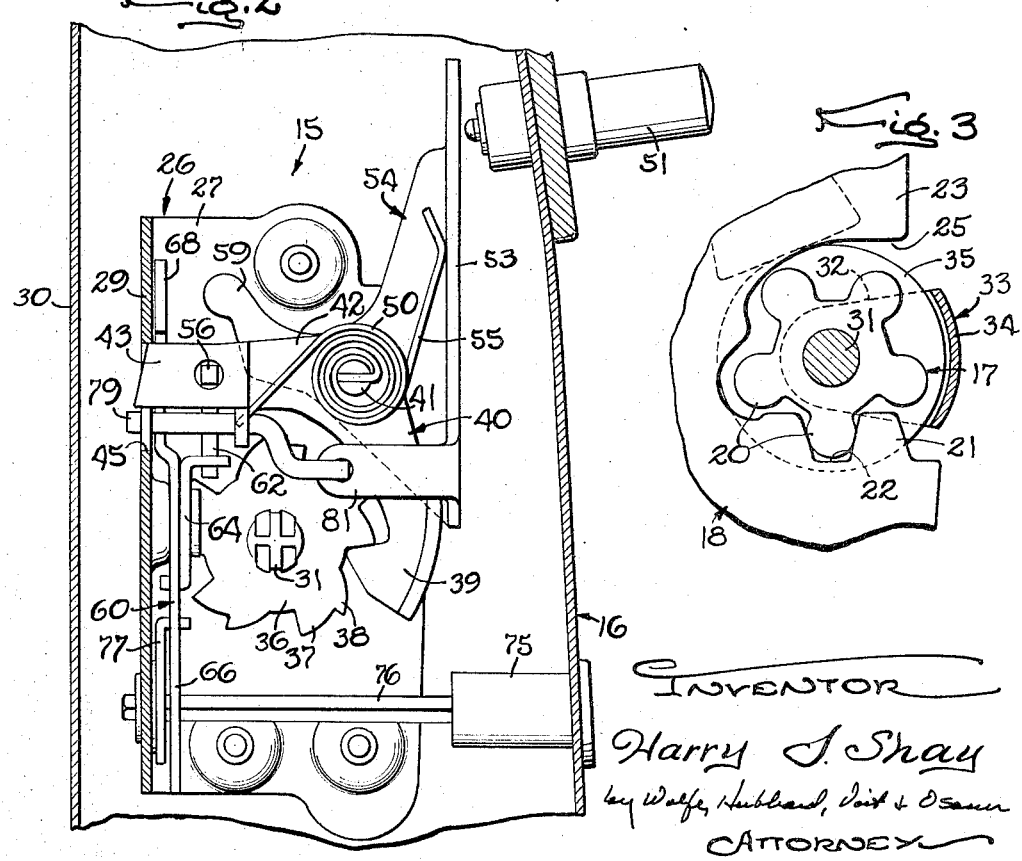
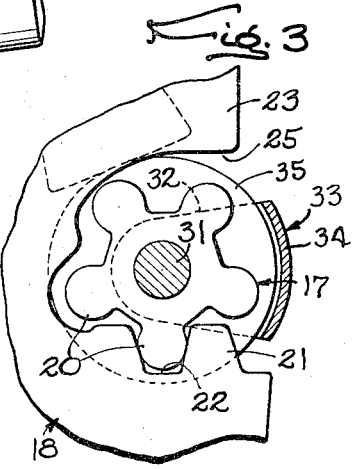
INVENTOR
Harry J. Shay
by Wolfe, Hubbard, Voit & Osann
ATTORNEYS

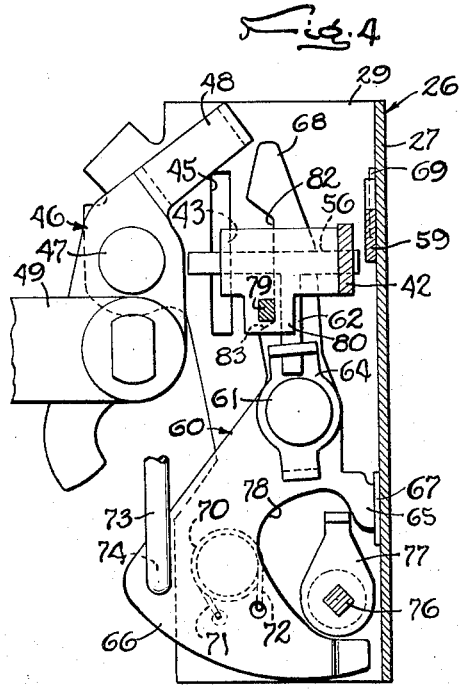
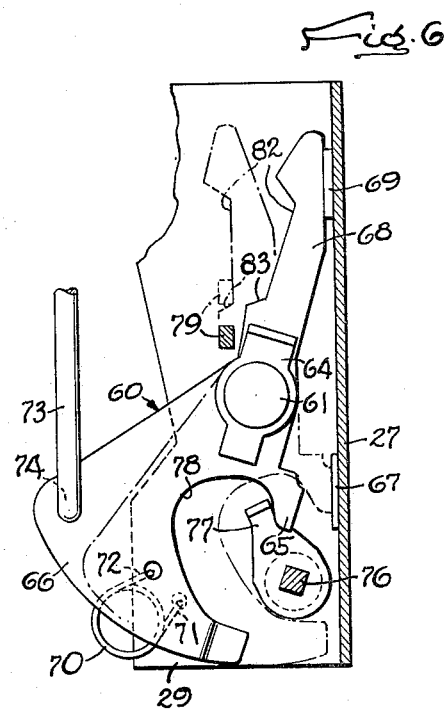
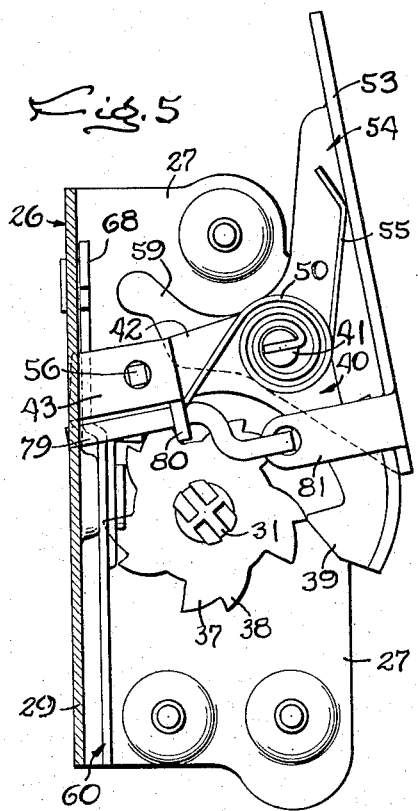
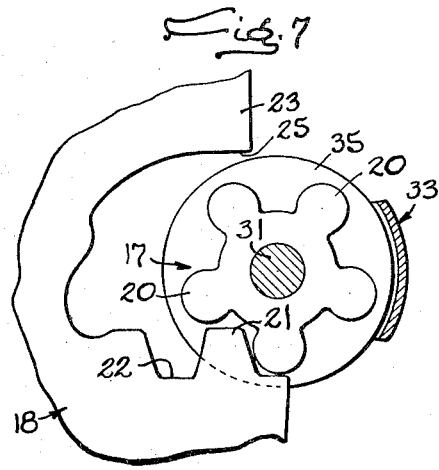

Dec. 13, 1966  H. J. SHAY  3,291,513
DOOR LATCH FOR AUTOMOTIVE VEHICLE
Filed March 23, 1964  5 Sheets-Sheet 3
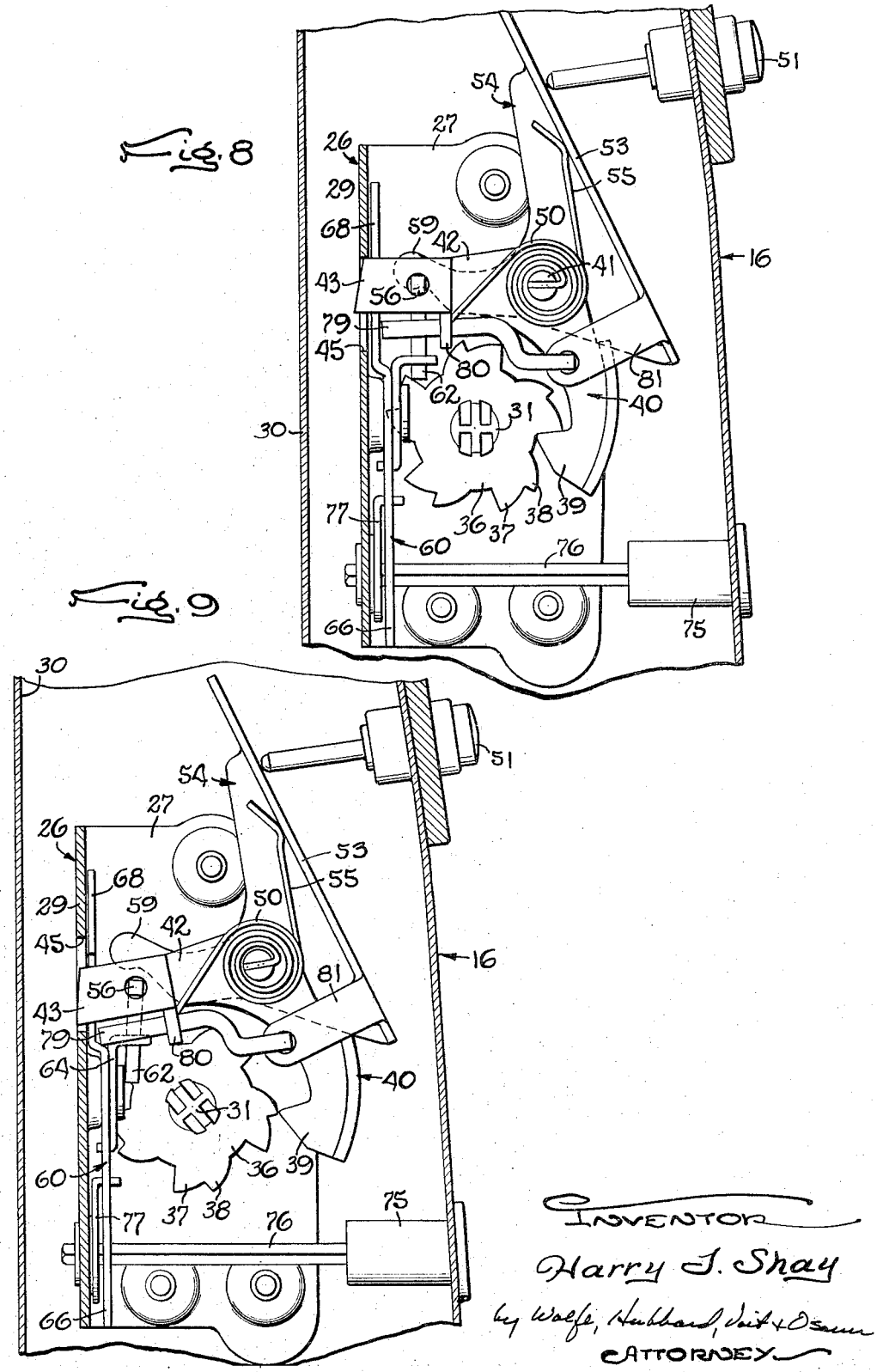
INVENTOR
Harry J. Shay
by Wolfe, Hubbard, Voit & Osann
ATTORNEY

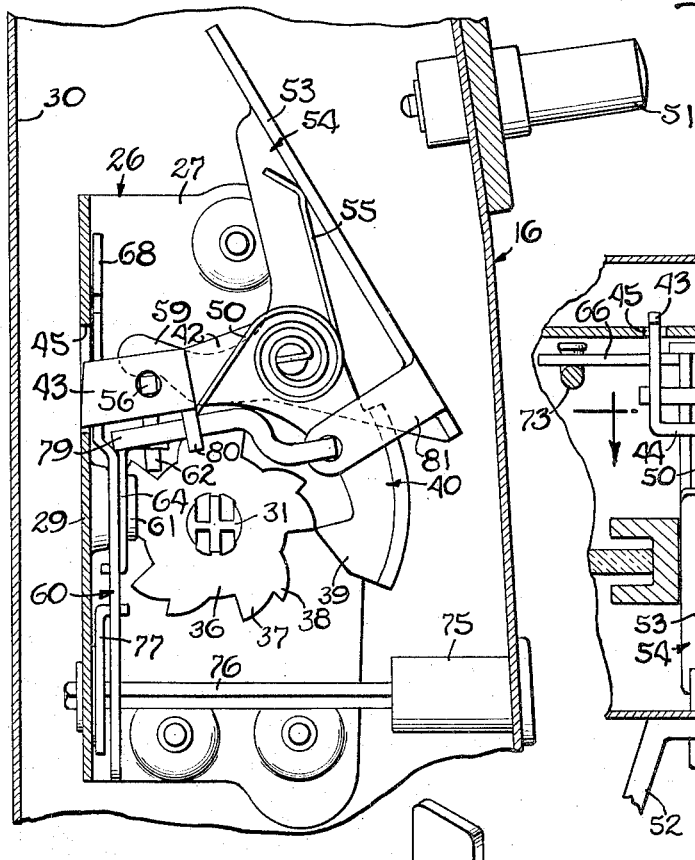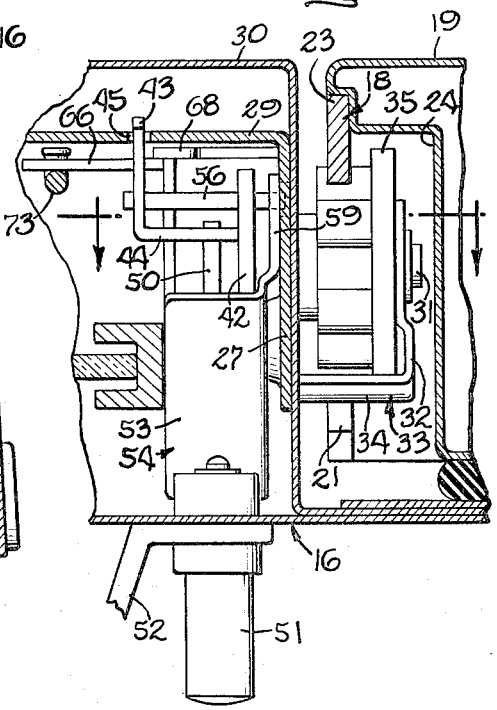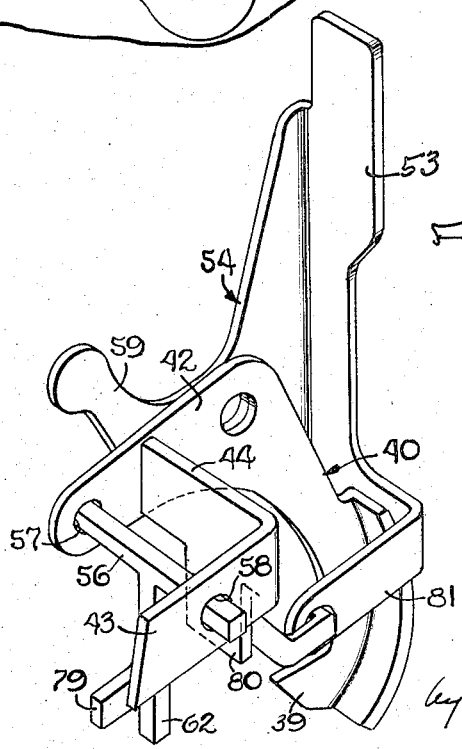

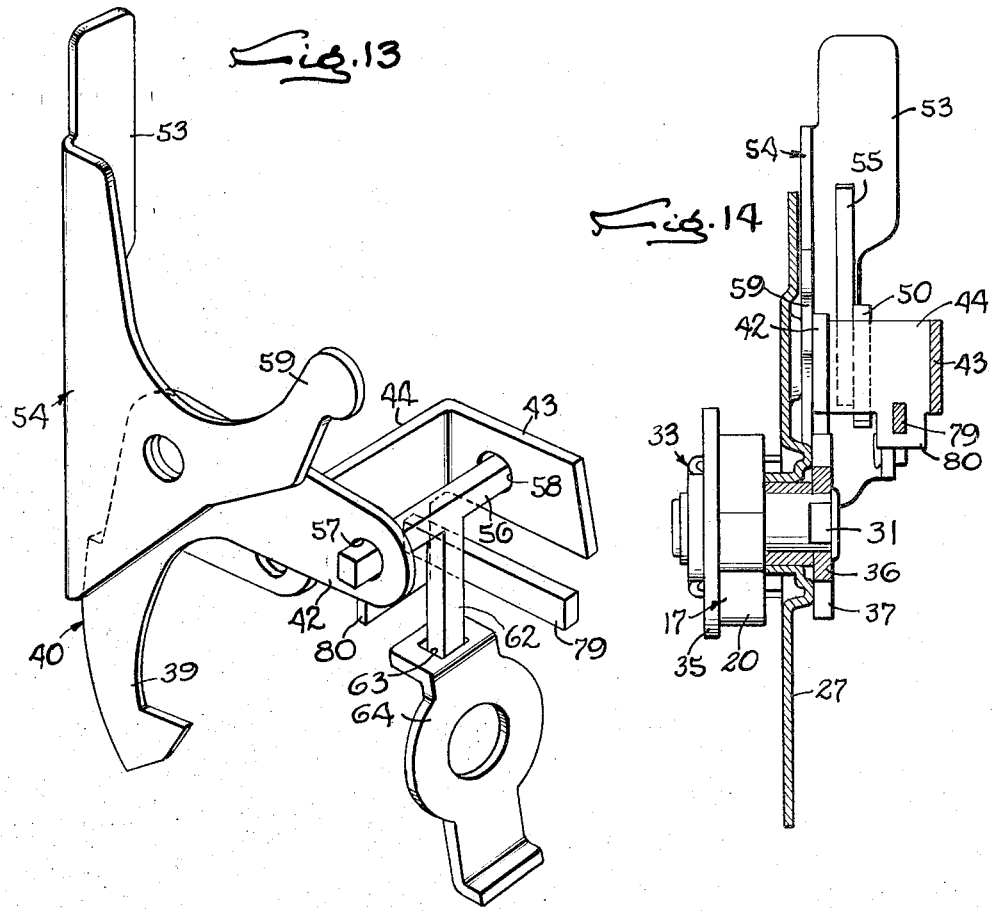

United States Patent Office 3,291,513
Patented Dec. 13, 1966

3,291,513
DOOR LATCH FOR AUTOMOTIVE VEHICLE
Harry J. Shay, Rockford, Ill., assignor to
L. W. Menzimer, trustee, Rockford, Ill.
Filed Mar. 23, 1964, Ser. No. 353,799
3 Claims. (Cl. 292—216)

This invention relates to a door latch of the type commonly used on automotive vehicles and, more particularly, to a latch in which a latching element is held in engagement with a striker by the coaction of a pawl and a ratchet and the pawl is disengaged from the ratchet to release the latch by a manually operable member which moves the pawl. The invention has special reference to an arrangement in which the latch is locked by uncoupling the pawl and the manual member so that the latter merely makes an idle motion when the latch is locked.

The general object of the invention is to provide a new and improved latch of the above character which is self-cancelling, that is, it automatically becomes unlocked as the door is closed, but which, after the latch has been put in the locked condition, may be closed while remaining locked by presetting the latch as by depressing the conventional push button operator on the outside of the door.

The principal object is to utilize the movement of the pawl, as occurs when the door is closed, to effect the movement of a part which unlocks the latch and to use the idle motion of the manual member for selectively disabling this part so that the latch remains locked.

A more detailed object is to provide the latch with a locking member which moves between locked and unlocked positions and to arrange the part which moves with the pawl to engage and move the locking member to the locked position except when the part is shifted to an inactive position by the manual member.

Other objects and advantages of the invention will become apparent from the following detailed description taken in connection with the accompanying drawings, in which FIGURE 1 is a fragmentary transverse sectional view of a latch embodying the novel features of the present invention and shows the parts in the locked position.

FIG. 2 is a fragmentary sectional view taken along the line 2—2 in FIG. 1.

FIG. 3 is a fragmentary sectional view taken along the line 3—3 in FIG. 1.

FIG. 4 is a fragmentary sectional view taken along the line 4—4 in FIG. 1.

FIG. 5 is a view similar to FIG. 2 but shows the position of the parts as the door is being closed and without the latch being preset.

FIG. 6 is a view similar to FIG. 4 but shows the parts in the unlocked position.

FIG. 7 is a view similar to FIG. 3 but with the parts approaching the latched position as the door is closed.

FIG. 8 is a view similar to FIG. 2 but with the door open and the latch locked and preset.

FIG. 9 is a view similar to FIG. 8 but shows the position of the parts after the door has been closed.

FIG. 10 is a view similar to FIG. 2 but shows the position of the parts as the latch is released.

FIG. 11 is a view similar to FIG. 1 but shows the parts in the unlocked position.

FIG. 12 is a perspective view of the pawl, the manual member and associated parts.

FIG. 13 is a perspective view from a different angle of the same parts shown in FIG. 12.

FIG. 14 is a sectional view view taken along the line 14—14 in FIG. 11.

As shown in the drawings for purposes of illustration, the invention is embodied in a latch 15 particularly adapted for use with the door 16 of an automotive vehicle and includes a pivoted latching member 17 which is carried by the door and coacts with a striker 18 mounted on a post 19 of the vehicle frame. Herein, the latching member 17 is in the form of a gear having teeth 20 (FIG. 3) which cooperate with a tooth 21 on the striker 18 and a pocket 22 disposed behind the striker tooth so that the door is latched in the closed position when one of the gear teeth 20 is firmly seated in the pocket 22.

In the present instance, the striker 18 includes a plate 23 which overlies a recess 24 (FIG. 1) in the post 19 and a notch 25 (FIG. 3) is formed in the outer edge of the plate with the tooth 21 formed along the bottom of the notch and adjacent the outer edge of the plate. When the door 16 is closed, the gear 17 is in the plane of the plate 23 and the notch 25 is large enough to receive the gear. Thus, as the door approaches the closed position, a tooth 20 on the gear 17 engages the striker tooth 21 and turns the gear counterclockwise as viewed in FIG. 3 to turn the adjacent gear tooth into the pocket 22.

To support the gear 17, an angle bracket 26 is disposed within the door 16 with the base plate 27 of the bracket secured against the inside of the end wall 28 of the door and the flange 29 extending along the inner wall 30 of the door. The gear is fast on the outer end of a shaft 31 which is journaled on the plate 27 and projects through the wall 28. The outboard end of the shaft 31 is supported by one leg 32 of an L-shaped bracket 33 whose other leg 34 is secured to the plate 27 of the bracket 26 and the usual anti-burst disk 35 is mounted on the shaft 31 between the gear 17 and the leg 32.

Keyed to the inner end of the shaft 31 is a ratchet 36 (FIG. 2) which is formed with a plurality of teeth 37 and 38, there being a pair of teeth 37 and 38 for each tooth 20 of the gear 17. The ratchet 36 cooperates with a pawl 39 which, together with the ratchet, constitutes the latching mechanism. The pawl 39 is one arm of a lever 40 fulcrumed by a pin 41 on the plate 27 of the bracket 26 and, when the parts are in the latched position as illustrated in FIG. 2, the pawl engages a tooth 37. To open the door 16, the pawl is swung back away from the rachet so that the gear 20 may turn out of engagement with the striker 18 as the door is swung. This turns the ratchet so that the tooth 37 passes the pawl as does the tooth 38 which defines the safety position of the latch.

In order to release the latch 15 from inside the vehicle, the pawl level 40 includes a generally horizontal arm 42 projecting toward the flange 29 of the mounting bracket 26. Carried by the arm 42 is a finger 43 (FIG. 12) which parallels the free end portion of the arm and is rigidly connected to the latter by a crosspiece 44. The finger 43 projects into a vertical slot 45 (FIG. 4) in the bracket flange 29 to guide the finger as it moves up and down with the lever 40. Adjacent the finger is a lever 46 pivotally mounted on the flange 29 at 47 and this lever includes an arm 48 which projects over the finger 43 so that, as the lever 46 is turned clockwise as viewed in FIG. 4, the arm 48 engages the finger 43 and pushes it downwardly. This turns the lever 40 and swings the pawl 39 away from the ratchet 36. Turning of the lever 46 is effected by the usual remote control handle (not shown) through the medium of a link 49 and, thereafter, the pawl is returned into engagement with the ratchet by a coiled torsion spring 50 having one end anchored to the pin 41 and the other end projecting under the crosspiece 44.

The latch 15 also may be released from outside the vehicle by a push button 51 associated with the handle 52 on the outer wall of the doors 16. For this purpose, the push button when depressed engages a flange 53 on an operating lever or contactor 54 which, like the pawl lever 40, is fulcrumed on the pin 41 and is urged toward the upright position by a second torsion spring 55 anchored to the pin and having an end bearing against the flange 53.

A coupling 56 is moveable selectively between active and inactive positions in which it respectively connects and disconnects the pawl lever 40 and the contactor 54. Thus, when the coupling is in the active position, the pawl lever and the contactor turn together about the pin 41 so that the contactor turns the pawl 39 out of engagement with the ratchet 36 as the push button 51 is depressed. The contactor, however, simply makes an idle motion when it is disconnected from the pawl lever and, in this condition, therefore, the latch 15 is locked and cannot be opened from the outside.

In the present instance, the coupling 56 includes a pin which spans the finger 43 and the arm 42 and slides transversely of the lever 40 in holes 57 and 58 (FIG. 12) formed in these parts. In the active position, the pin 56 projects through and beyond the arm 42 where, as shown in FIG. 11, it is in the path of an arm 59 of the contactor 54. Thus, in this position of the pin, the arm 59 engages the pin end when the contactor is turned by the push button 51 and this swings the lever 40 about the pivot 41 to disengage the pawl 39 from the ratchet 36. When the pin 56 is shifted endwise away from the bracket base plate 27 to the inactive position illustrated in FIG. 1, the pin 56 is out of the path of the arm 59 which then makes an idle motion when the contactor 54 is turned. In effect, therefore, the latch 15 is locked against opening from the outside when the pin is in the inactive position.

To shift the pin 56 back and forth between its active and inactive positions, a generally upright locking lever 60 (FIGS. 4 and 6) is fulcrumed at 61 on the flange 29 of the bracket 26 and a finger 62 rigid with and projecting downwardly from the mid-portion of the pin extends loosely through a hole 63 in an ear 64 which is carried by the locking lever. Thus, as the latter is turned back and forth between the locked position shown in FIG. 4 and the unlocked position shown in FIG. 6, the ear 64 slides the pin 56 endwise between the inactive and the active positions. The locked position of the lever 60 is defined by a leg 65 on the lower arm 66 of the lever abutting a rubber pad 67 on the inside of the bracket base plate 27 while the locked position is assumed when the upper arm 68 engages a similar rubber pad 69 on the base plate.

The locking lever 60 is urged fully into either the locked or the unlocked position by an over-center torsion spring 70 having one end 71 anchored to the flange 29 and the other end 72 connected to the lower arm 66 of the lever so that, when the end 72 passes across the center defined by the fulcrum 61 and the end 71, the spring snaps the lever to a new position. As is customary with latches of this type, the locking lever 60 may be turned to a selected position by various manual operators. For example, it may be turned by the conventional garnish molding button (not shown) which acts through an upright link 73 (FIG. 4) pivotally connected at 74 to the lower arm 66 of the locking lever. Also, the locking lever may be swung from the locked position to the unlocked position by the lever 46 when the latter is turned in the direction to release the latch 15 and, for this purpose, the upper arm 68 of the locking lever projects up into the path of the arm 48 of the lever 46 so that, before the arm 48 engages the finger 43, it strikes the arm 68 and turns the locking lever 60 to the unlocked position.

As shown in FIGS. 2 and 4, the locking lever 60 may be turned from outside the vehicle by a key (not shown) which is inserted in a key cylinder 75 and turns a horizontal shaft 76 connected to the cylinder. A finger 77 fast on the shaft 76 projects into a relatively large notch 78 in the lower arm of the locking lever to engage one or the other of the two sides of the notch as the shaft 76 is turned back and forth. In each case, the finger 77 turns the locking lever until the spring 70 has moved over center and then the spring continues the movement of the lever to the selected position.

The present invention contemplates constructing the latch 15 in a novel manner so that it is self-cancelling, that is, the latch may be locked as by depressing the garnish button link 73 while the door 16 is open but, unless the push button 51 is held depressed while the door is closed, closing of the door automatically will move the parts to the unlocked position. This is achieved by taking advantage of the swinging movement of the pawl lever 40 as the door is closed, such swinging being caused by the pawl 39 riding over the teeth 37 and 38 when the gear 17 is turned as shown in FIG. 5. Thus, a part 79 is carried by the lever 40 and normally the locking lever 60 when in the locked position is in the path of this part so that, as the part swings with the lever 40, it cams the locking lever to the unlocked position. The part 79, however, is movably mounted on the lever 40 and is connected to the contactor lever 54 whereby swinging of the operating lever independently of the lever, as occurs when the latch is in the locked position and the push button 51 is depressed, shifts the part 79 clear of the locking lever 60. Thus, the latter remains in the locked position when the door is fully closed.

In the present instance, the part 79 is an elongated rod which generally parallels the arm 42 of the lever 40 and slides endwise back and forth in a strap 80 formed integrally with and depending from the crosspiece 44. Thus, the rod 79 turns with the arm 42 of the pawl lever 40 but is free to move longitudinally relative to this arm. The outer end portion of the rod is bent downwardly and then is bent again to project horizontally toward the flange 53 of the contactor lever 54 where it is pivotally connected to a lug 81 projecting inwardly from the flange (FIGS. 10 and 12).

The free end of the rod 79 normally extends into a recess 82 (FIGS. 4 and 6) formed in the side of the arm 68 of the locking lever 60. The lower edge 83 of the recess is inclined downwardly and outwardly to constitute a cam surface coacting with the rod. Thus, when the rod is in the normal position as shown in FIGS. 4 and 5, the rod swings down with the arm 42 as the pawl 39 rides over the teeth of the ratchet 36 during the closing of the door 16. During such downward swinging, the free end of the rod engages the cam surface 83 (broken line position in FIG. 6). Continued downward movement thereby cams the locking lever in a clockwise direction until the spring 70 crosses its center position at which time the locking lever snaps to the unlocked position.

In order to close the door 16 with the parts in the locked position and without releasing the latch 15, the rod 79 first is retracted so that it does not engage the cam surface 83 when the lever arm 42 swings down. This is achieved by taking advantage of the uncoupling of the pawl lever 40 and the contactor 54 when the latch is locked. At that time, depressing the push button 51 swings the contactor independently of the pawl lever and this turning of the contactor is utilized to retract the rod 79. Thus, when the contactor is turned in this manner, the rod slides back in the strap 80 from the position illustrated in FIG. 5 to the position shown in FIG. 8. This is known as the preset position and, in this position, the free end of the rod passes clear of the cam surface 83 as illustrated in FIG. 9. As a result, the latch 15 remains locked as the door is closed.

To summarize the operation of the latch 15, the latter is closed and unlocked when the parts are in the position shown in FIG. 11, that is, the locking lever 60 is to the right as viewed in FIG. 6 so that the pin 56 is in the path of the contactor 54. Unlatching, then, may be accomplished in either of two ways. For example, the remote control lever 46 may be turned from inside the door 16 to engage the arm 42 and swing the pawl lever 40 in the direction to release the pawl 39 from the ratchet 36. Alternatively, the pawl lever may be turned in the same direction by depressing the push button 51 which turns the contactor 54, the latter engaging the pin 56 to turn the pawl lever.

With the door 16 closed, the latch may be locked by turning the locking lever 60 back to the position illustrated in FIG. 4. This shifts the end of the pin 56 out of the path of the contactor 54 so that the latter merely makes an idle motion when engaged by the push button 51 and the door cannot be opened from the outside. The locking lever may be turned to the locked position either by the key lever 77 or by the garnish molding button (not shown) through the link 73 and the latch may be unlocked in the same manner. Unlocking may also be accomplished by the remote control lever 46 automatically as the latter is turned to release the latch. Thus, the lever 46 first engages the locking lever 60 and swings it to the unlocked position and then engages the arm 42 of the pawl lever 40 to release the latch.

If the latch 15 should be locked with the door 16 open, the latch normally will become unlocked as the door is closed. This occurs because the closing of the door turns the ratchet 36 as the gear 17 rolls into engagement with the strike 18 and this turns the pawl lever 40 counterclockwise as shown in FIG. 5. The rod 79 swings down with the pawl lever and engages the cam surface 83 on the locking lever 60 which thus is cammed to the unlocked position. Should the push buttom 51 be depressed while the door is being closed, however, the latch will remain closed. This action results from the fact that the contactor 54 passes free of the pin 56 and turns relative to the pawl lever 40. Since the rod 79 is connected to the contactor, such relative turning retracts the rod which thereby clears the cam surface 83 as it swings with the pawl lever and the locking lever 60 remains in the locked position.

I claim as my invention:

1. In a latch, the combination of, a base, a latching member pivotally mounted on said base to turn to latched and unlatched positions, a ratchet mounted to turn with said latching member, a pawl supported by said base and movable into and out of engagement with said ratchet, an operating member mounted on said base for movement independently of said pawl between first and second positions, a locking member supported on said base for movement between locked and unlocked positions, a connector carried by said locking member and operable to couple and uncouple said pawl and said operating member when said locking member is in said unlocked and locked positions respectively whereby the operating member when coupled to the pawl moves the latter out of engagement with said ratchet and permits said latching member to turn to said unlatched position, said pawl being moved by said ratchet as said latching member is turned from the unlatched position to the latched position, a part normally disposed in an active position and coupled to said operating member to be moved to an inactive position when the operating member is moved to said second position, and a connection between said part and said pawl and operable to move the part with the pawl when said latching member is turned to the latched position, said part being operable upon such movement and when in said active position to engage said locking member and move the latter to said unlocked position.

2. In a latch, the combination of, a base, a latching member pivotally mounted on said base to turn to latched and unlatched positions, latching means mounted on said base and operable selectively to hold said latching member in said latched position and to release the latching member for turning to said unlatched position, an operator movable between first and second positions, a locking member mounted on said base to move between locked and unlocked positions and operable in said locked position to uncouple said operator and said latching means and in said unlocked position to couple the operator and the latching means whereby the operator when moved to said second position moves the latching means to release said latching member when said locking member is in said unlocked position, a part connected to said latching means to move bodily with the same and also to move relative to the latching means between active and inactive positions, said part being operable when in said active position to move said locking member to said unlocked position as said latching member moves to said latched position, and a connection between said operator and said part to move the part to said inactive position when the operator moves to said second position.

3. In a latch, the combination of, a base, a latching element mounted on said base to turn to latched and unlatched positions, an operating member mounted on said base to move between first and second positions, mechanism selectively operable to hold said latching element in said latched position and to release the element for turning to said unlatched position, locking means including a locking member mounted on said base for movement between locked and unlocked positions and operable respectively in said positions to uncouple and couple said operating member and said mechanism, said locking member having a cam surface disposed in a predetermined plane, a part connected to said operating member to be projected into and out of said plane as the operating member is moved to said first and second positions respectively, and a connection between said part and said mechanism and operable when the part is projected into said plane to move the part against said surface and cam said locking member to said unlocked position as the latching element is turned to said latched position.

References Cited by the Examiner

UNITED STATES PATENTS

| | | |
|---|---|---|
| 2,641,495 | 6/1953 | Leslie et al. |
| 2,700,565 | 1/1955 | Smith. |
| 2,993,360 | 7/1961 | Craig. |
| 3,027,184 | 3/1962 | De Vito. |
| 3,033,602 | 5/1962 | Lee. |

EDWARD C. ALLEN, *Primary Examiner.*

RICHARD E. MOORE, *Examiner.*